United States Patent von der Lehr

[11] 4,066,488
[45] Jan. 3, 1978

[54] PROCESS FOR THE JOINING (BONDING) OF LINES (STRIPS)

[76] Inventor: Alfred von der Lehr, Eichenstrasse 21, Germany

[21] Appl. No.: 785,563

[22] Filed: Apr. 7, 1977

[30] Foreign Application Priority Data

Apr. 9, 1976 Germany .............................. 2615460

[51] Int. Cl.² ........................................... B32B 31/02
[52] U.S. Cl. ........................................ 156/83; 128/90; 128/156; 156/307; 156/308; 264/343; 428/420; 428/315; 428/310; 428/524
[58] Field of Search .................. 156/78, 308, 83, 313, 156/307; 264/248, 343; 428/420, 315, 310, 524; 526/9; 260/73 L, 2.5 F; 128/90, 156

[56] References Cited

U.S. PATENT DOCUMENTS

| | | | |
|---|---|---|---|
| 2,269,125 | 1/1942 | Quenelle et al. | 156/307 |
| 2,360,712 | 10/1944 | Paggi | 428/524 |
| 2,441,542 | 5/1948 | Lawrence | 260/73 L |
| 2,659,935 | 11/1953 | Hammon | 128/156 |
| 2,664,366 | 12/1953 | Wilson | 260/73 L |
| 2,992,958 | 7/1961 | Yamaguchi | 156/307 |
| 3,122,141 | 2/1964 | Crowe | 128/156 |
| 3,190,843 | 6/1965 | Hofelmann et al. | 526/9 |
| 3,663,470 | 5/1972 | Nishimura et al. | 260/2.5 F |

Primary Examiner—Charles E. Van Horn
Assistant Examiner—J. J. Gallagher
Attorney, Agent, or Firm—Isler and Ornstein

[57] ABSTRACT

A process is disclosed for the joining of lines of acetalyzed polyvinyl alcohol foam with each other or with textile fabrics. The process is characterized by the fact that the parts of the lines to be joined together are brought into contact with each other and hot pressed, in the presence of moisture at tool temperatures of from 100° to 300° C. and a pressure of 1-10 kp/cm². The process is further characterized by the fact that the line of acetalyzed polyvinyl alcohol foam is saturated with water to its swelling limit, and by the application of the process to a line of formaldehyde-acetalyzed polyvinyl alcohol foam, of which the degree of acetalyzation amounts to about 20% by weight.

3 Claims, 1 Drawing Figure

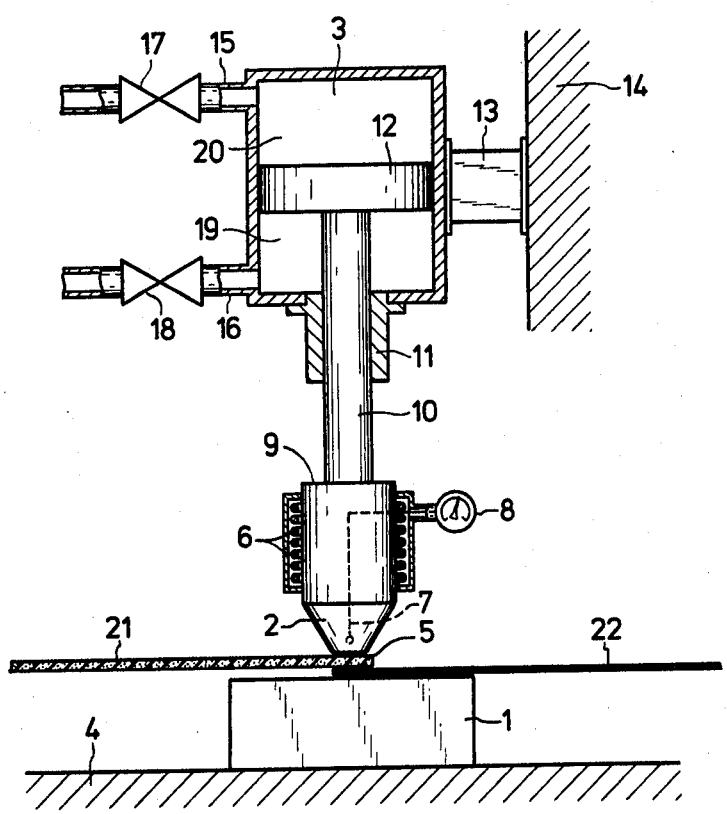

PROCESS FOR THE JOINING (BONDING) OF LINES (STRIPS)

The invention concerns a process for the bonding of lines of acetalysed polyvinyl alcohol foam with each other or with textile fabrics.

It is known that polyvinyl alcohol, by acetalysing, thus, by condensation with preferably low-molecular aldehydes, such as formaldehyde, acetaldehyde, butyraldehyde, benzaldehyde or the like, can be made more or less insoluble in water, according to the degree of acetalization. If the reaction is carried out in the presence of pore-forming substances, sponge-type structures can be produced in this way, which after complete condensation can be cut to lines (strips), for example. A peculiarity of the foams or sponges produced in this way is that, in the dry and thus water-free condition, they are largely hard and have considerable resistance to bending, but are able, according to their structure, to absorb 500 to 1000% of their weight in water, and then, with swelling, become spongy and easily movable. This property has led to lines of acetalysed polyvinyl alcohol foam being used as support bandages. Such support bandages, which may be used as a substitute for gypsum bandages, allow them to be laid easily, in the water-containing condition, and because of their flexibility they hug closely any curves, uneveness and the like in the member to be bandaged. After drying, then, they go back to their solid condition, and exert their support function for a practically unlimited time. If the bandage is to be removed, it need only be softened with water again, so that it recovers its old flexibility with swelling, and can then be removed, finally, like a normal elastic bandage.

In the processing of lines of acetalysed polyvinyl alcohol foams to support bandages, it is often necessary to join together several such lines, or (as described in German Petty Pat. No. 75 35 940), to join the ends of the line, firmly and permanently, with sections of textile fabrics, weaves, or the like. These joinings can be done by sewing or gluing, but only deficient tear strengths of the transition zones can be attained.

The problem exists of providing a process for the joining of lines of acetalysed polyvinyl alcohol foam with each other or with textile fabrics, which leads to tear strengths of the bonded places which are at least on the order of the tear strength of the line of foam material.

This problem is solved, according to the invention, by the fact that the parts of the line to be joined together are brought in contact with each other and in the presence of moisture, with a tool temperature of 100°–300° C., preferably 200°–250° C., and a pressure of 1–10 kp/cm$^2$, preferably 4–6 kp/cm$^2$, are hot-pressed. It has been observed that with such a hot pressing, in the wet condition, a joining of the two parts of the line takes place in a short time which is distinguished by unusually good tear strength, even in the wet condition, and which is in no way hardened.

As to the chemistry of the reaction taking place in hot pressing, it may be assumed that a partial hydrolysis of the acetal bonds takes place, which leads then, at the same time, to the forming of bridges to the neighboring line or the fibers forming same. It has been found, surprisingly, that by this process, which is also easy to carry out industrially and can be well controlled, makes it possible to conduct not only joinings to cellulose lines, such as cotton, rayon and the like, but also joinings to plastic fibers, such as polyacrylonitrile fibers or polyester fibers.

To carry out the process it is advantageous to proceed as follows: first the line, consisting of acetalysed polyvinyl alcohol foam, is saturated to its swelling limit with water. This may be done in the usual way by dipping into water and then removing the excess water. The line, so pretreated, is brought into overlapping contact with the other line, with which it is to be joined, and the contact place is treated with a correspondingly designed hot welding unit, under pressure. If rather long joining seams are to be produced, it may be advantageous to use a welding electrode which has the form of a wheel which can be heated; if only short joining sections are to be prepared, as in the case of the joining of fabric ends on support bonding lines, a suitably formed pressure welding head, which heated and raised and lowered, will suffice, as described, by way of example, farther on.

The process provided may be applied, in principle, to all sorts and settings of acetylized polyvinyl alcohol foam lines. For the production of support bondings, in which as high as possible a strength in the dry condition is important, it has proved good when the process is applied to lines of polyvinyl alcohol foam which are acetalysed with formaldehyde and of which the degree of acetalyzation is about 20% by weight. Under these conditions, the foam is acetalysed practically completely, so that the maximum attainable dry strength results.

The process will be explained below from one example of execution.

EXAMPLE

A polyvinyl alcohol foam, acetalysed with formaldehyde, of which the degree of acetalyzation was about 20%, was used in line (strip) form. The line thickness, in the swollen condition was 2 mm., the line width 100 mm.

A section of this line was dipped in water at room temperature, taken out after 20 minutes, and pressed by hand until not a drop more of water could be removed. The line section, so prepared, was laid with overlapping on a section of cotton cloth, and then hot-pressed at temperatures between 220° and 250° C. for one to two seconds at raised pressure. Table which follows shows the several conditions maintained.

| Line thickness in swollen condition | Tool temperature | Pressing pressure | Pressing time |
|---|---|---|---|
| 2 (mm) | 220° C. | 5 kp/cm$^2$ | 1 second |
| 3 | 250 | 6 kp/cm$^2$ | 1–2 second |
| 4 | 250 | 6 kp/cm$^2$ | 2 seconds |

In all cases, a joining of the two line parts was attained, which had a good strength. In tearing the line in the tearing machine, the bonding zone was not destroyed, but rather the foam line at some distance from the joining zone.

The hot pressing device used in the experiments will be explained below from the FIGURE. In the FIGURE, a schematic cross section through the device is represented.

The device consists essentially of an anvil 1, a pressing stamp 2 and a hydraulic cylinder 3.

The anvil 1, which may consist of any desired material, since the forces to be absorbed are only slight, consisted in the example, of stainless steel; it was fastened to a solid (stationary) base surface 4 with screws.

The pressing stamp 2 was made of copper and had, at its lower end surface 5, the working surface, a tapering, which had a width of approximately 5 mm. Since short joining seams of 100 mm. length were to be produced with the device, the stamp had a corresponding dimension extending perpendicular to the plane of the drawing. In its middle part, the stamp was made thicker, and it was surrounded at this place with an electric heating coil 6, well insulated toward the outside. The heating coil made it possible to heat the stamp until it took on at its end surface 5, a working temperature, remaining very constant, between 100° and 300° C. To be able to measure the working temperature, immediately next to the end surface 5, a temperature feeler 7 was arranged inside the stamp, which was connected with an indicating instrument 8, which, for simplicity, was placed right on the outer insulation of the heating coil 6.

The upper end surface 9 of the pressing stamp passed into (became) a piston rod 10, which, conducted through a guide bushing 11, reached in the hydraulic cylinder 3 and was connected there with the piston 12. The cylinder 3, itself, was fastened, through a bearing arm 13 to a solid (stationary) holding device 14. To be able to push the piston upward or downward, the hydraulic cylinder 3 was connected with two pipelines 15 and 16, which could be connected, through valves 17 and 18, controllably, with a fluid pressure pump, not shown.

To carry out the welding process, first the valve 17 is opened, and then, through the valve 18 and the pipeline 16, hydraulic fluid is let into the space 19. The piston 12, and with it, the pressing stamp 2 also, is moved upward and so drives the hydraulic fluid out of the space 20. The heating coil 6 was now turned on and the desired temperature on the end surface 5 was awaited. This temperature could be read on the indicating instrument 8.

Meanwhile, the two lines to be joined together, namely, the foam material line 21 and the cotton cloth line 22, were laid with overlapping edges on the anvil 1, and brought into the zone of action of the lower end surface 5 of the pressing cylinder 2. After reaching the temperature, the space 20 of the hydraulic cylinder 3 was filled with pressing fluid, while the piston 12, and with it the pressing stamp 2 also, were lowered, and the hydraulic fluid driven out of the space 19 through the line 16 and the valve 18.

Through regulation of the fluid pressure in the space 20, the working pressure of the pressing stamp 2 could be exactly set. After carrying out the pressing process, the pressing stamp was raised again and the lines 21 and 22, now joined together, removed from the anvil.

Having thus described my invention, I claim:

1. Process for the joining of strips of acetalysed polyvinyl alcohol foam with each other or with textile fabrics, with the distinction that the parts of the strips to be joined together are brought in contact with each other and hot pressed, in the presence of moisture at temperatures of 100°–300° C., preferably 200°–250° C., and a pressure of 1–10 kp/cm$^2$, preferably 4–6 kp/cm$^2$.

2. Process according to claim 1, with the distinction that the strip of acetalysed polyvinyl alcohol foam is saturated with water to its swelling limit.

3. Application of the process according to claim 2 to a strip, known per se, of formaldehyde-acetalysed polyvinyl alcohol foam, of which the degree of acetalyzation amounts to about 20% by weight.

* * * * *